United States Patent
Hartwig (10) Patent No.: US 9,945,714 B1
(45) Date of Patent: Apr. 17, 2018

(54) METHOD OF DETERMINING THE MASS OF OBJECTS FROM A PLURALITY OF X-RAY IMAGES TAKEN AT DIFFERENT ENERGY LEVEL

(71) Applicant: Mettler-Toledo, LLC, Columbus, OH (US)

(72) Inventor: Norbert Hartwig, Waldems (DE)

(73) Assignee: Mettler-Toledo, LLC, Columbus, OH (US)

( * ) Notice: Subject to any disclaimer, the term of this patent is extended or adjusted under 35 U.S.C. 154(b) by 0 days.

(21) Appl. No.: 15/561,419

(22) PCT Filed: Apr. 6, 2016

(86) PCT No.: PCT/US2016/026144
§ 371 (c)(1),
(2) Date: Sep. 25, 2017

(87) PCT Pub. No.: WO2016/164411
PCT Pub. Date: Oct. 13, 2016

(30) Foreign Application Priority Data

Apr. 7, 2015 (EP) ..................... 15162594

(51) Int. Cl.
*G01N 23/04* (2018.01)
*G01V 5/00* (2006.01)
*G01G 9/00* (2006.01)

(52) U.S. Cl.
CPC .................... *G01G 9/005* (2013.01)

(58) Field of Classification Search
None
See application file for complete search history.

(56) References Cited

U.S. PATENT DOCUMENTS

| | | | |
|---|---|---|---|
| 6,192,101 B1 | 2/2001 | Grodzins | |
| 6,678,396 B2 | 1/2004 | Bartle | |
| 7,991,110 B2 | 8/2011 | Hirose | |
| 8,068,656 B2 | 11/2011 | Hirose | |
| 2002/0168046 A1 | 11/2002 | Hansen | |
| 2007/0183568 A1 | 8/2007 | Kang et al. | |
| 2010/0046703 A1* | 2/2010 | Hirose | G01G 9/005 378/54 |
| 2011/0243382 A1* | 10/2011 | Morton | A61B 6/032 382/103 |
| 2015/0330915 A1* | 11/2015 | Jin | H01L 22/12 378/62 |
| 2016/0189360 A1* | 6/2016 | Kang | G06T 7/0004 378/57 |

* cited by examiner

*Primary Examiner* — Hoon Song
(74) *Attorney, Agent, or Firm* — Standley Law Group LLP (57) ABSTRACT

A method of determining the mass of an object by scanning the object in a radiographic inspection system, specifically in an X-ray scanner with the capability to take scan images at a plural number J of energy leves, has three modes or parts, namely: an initial learning mode, a normal operating mode, and a learning improvement mode. An inintial learning mode in which refernce object are scanned and their actual masses weighed and stored as reference values. A normal operating mode wherein smaple objects with unknown mass m are scanned and analyzed for compatibility with the reference values, and if found incompatible, the method switches to the learning improvement mode. A learning improvement mode in which the actual mass of the sample object found incompatible is determined by weighing and updates the stored reference values.

15 Claims, 7 Drawing Sheets

METHOD OF DETERMINING THE MASS OF OBJECTS FROM A PLURALITY OF X-RAY IMAGES TAKEN AT DIFFERENT ENERGY LEVEL

The invention relates to the field of radiographic inspection systems, for example scanner systems in which articles or materials under inspection travel through an X-ray machine, or any other radiographic apparatus in which X-ray images are taken of individual objects or bulk materials in a moving or stationary state. Applications for inspection systems of this kind include, among others, the quality control inspections performed in the food and pharmaceutical industries, for example to detect the presence of foreign objects in packaged products, or also to verify a specified composition of products, such as the salt or fat content of sausages, based on the scan images. As has long been known, it is also possible to determine or at least estimate the mass of an object based on an X-ray image, and the present invention concerns in particular an improved method of determining or verifying the mass of an object from the image obtained with a radiographic inspection system.

An inspection system or scanner system of this type usually has a stationary radiation source and a stationary linear detector array arranged inside a cabinet-style enclosure with an entrance and an exit opening, and a conveyor belt for transporting articles under inspection through the entrance opening, through the space between the radiation source and the detector array, and out through the exit opening. Typically, the imaging radiation originates as a fan-shaped planar bundle of rays from a localized source, e.g. an X-ray tube, and is received by a linear array of photodiodes that are collectively referred to as a detector, wherein the fan-shaped radiation bundle and the linear array of photodiodes lie in a common plane, also referred to as the scanning plane, which runs substantially orthogonal to the travel direction of the conveyor carrying the articles under inspection. While the articles move through the scanning plane, the update frequency of the detector is coordinated with the speed of the conveyor so that the sequence of signals generated by the detector array can be translated into a pattern of raster dots with different brightness values expressed for example in terms of an 8- or 16-bit brightness scale, representing a transparent shadow image of the material bodies between the radiation source and the radiation detector. If a scanned article contains foreign objects such as metal fragments, which have a lower transmittance to the scanning rays than the scanned article, the radiographic image will show such foreign objects as darker areas within the transparent shadow image of the scanned article.

From the scan image, i.e. the totality of brightness values of the pixels that make up the image, it is possible to determine or at least estimate the mass of the object, as the brightness value of each individual pixel dot is representative of the intensity of the ray received by the respective diode, and the intensity, in turn, is correlated to the properties of the material and to the distance traversed by the ray inside the object. With some idealizing assumptions which will be explained below, the brightness or intensity $I_i(\mu,d)$ of an individual pixel i (out of n pixels of the entire scan image) as a function of the attenuation $\mu$ and the distance d traveled by the respective ray inside the material of the scanned object can be expressed by the exponential relationship $$I_i(\mu,d)=I_{0,i} \cdot e^{-31\ \mu \cdot d} \tag{1}$$

wherein $\mu$ is the absorption coefficient of the material and $I_0$ is the full radiation intensity received by the same diode when the path from the radiation source to the sensor diode is not interrupted by an inspection object. The dimensionless ratio $I_i(\mu,d)/I_{0,i}$ will hereinafter also be referred to as the pixel value $P_i$, and the entirety of pixel values $P_i$ will be referred to as scan image. Accordingly, the distance $d_i$, i.e. the local thickness of the inspection object at the image pixel i, can be determined from the equation $$d_i = -(1/\mu) \cdot \ln(I_i/I_{0,i}) = -(1/\mu) \cdot \ln(P_i) \tag{2}$$

and the mass of the inspection object can be determined or at least estimated by the summation over all of the image pixels $$m = -\frac{1}{k} * \sum_{i=1}^{n} \ln \frac{I_i}{I_{0,i}} = -\frac{1}{k} * \sum_{i=1}^{n} \ln(P_i) \tag{3}$$

or, by replacing the negative sum $$-\sum_{i=1}^{n} \ln \frac{I_i}{I_{0,i}}$$

with the symbol A, $$m = \frac{1}{k} * A \tag{3'}$$

wherein k represents an overall mass factor between the total logarithmic absorption A (represented by the summation) and the mass m of the inspection object.

However, as mentioned above, this estimate of the mass relies on some idealizing assumptions, primarily that the absorption coefficient is assumed to be constant throughout the inspection object as well as from one object to the next, and for rays of all energy levels E within the entire spectrum emitted by the X-ray tube which may typically cover a range from a low end of, e.g., 20 keV to a high end of, e.g., 60 to 140 keV. In other words, the radiation $I_0$ emitted by the X-ray tube is not monochromatic, but is distributed over a spectrum $I_0(E)=\bar{I}_0 \cdot \tau(E)$, wherein $\bar{I}_0$ is the non-attenuated mean intensity averaged over the entire energy range and $\tau(E)$ is the probability density that a detected photon is at energy E. The absorption coefficient p depends to a significant degree on the energy level of the radiation, with the lower-energy components of the spectrum typically being absorbed more, while the higher-energy components of the spectrum are typically absorbed to a lesser degree. The attenuation $\mu$ is material-dependent: the higher the atomic number of a material, the larger will be the ratio of higher-energy radiation in proportion to the total radiation transmitted, a phenomenon which is referred to as "beam hardening". The expression "beam hardening" is commonly used in connection with shielding measures, because high energy radiation, such as gamma radiation and X-rays, becomes "harder" as it passes through matter, meaning that the remaining spectrum after passage contains only higher-energy photons.

In consequence, the logarithmic relationship (2) between $d_i$ and $I_i$ represents only an approximation of the actual situation. In addition, it should also be noted that the foregoing equations imply the assumption that the radiation traversing the object is vertical, parallel and non-divergent, a condition which is only loosely approximated by a fan-shaped radiation bundle.

Summarily speaking, to determine the mass of an object composed of a plurality of different materials, one would have to know all of the exact spectrum-dependent absorption coefficients μ with the respective material thicknesses, the change of μ along each ray inside a material and the exact number of different materials. The exact relationship would then be:

$$I(E) = I_0 \int_E \tau(E) \cdot e^{-\int_s \mu(E,r(s))ds} dE$$

wherein:
  $I_0 \cdot \tau(E)$ is the non-attenuated X-ray intensity which is emitted by the source and which would be received by the detector in the absence of any material between the X-ray source and the detector, p1 μ is the absorption coefficient which is dependent on the energy level (wavelength) of the radiation and on the location coordinate s along the ray path, and
  I(E) is the measured X-ray intensity at the sensor after a ray has traveled through the test object.

Consequently, the concept of estimating the mass from a radiographic image holds the most promise in cases where there are no drastic variations in the composition as well as in the shape and size of the inspection objects, i.e. typically for checking the mass of nominally equal objects. The mass correlation factor k can be initially determined and periodically updated if necessary by a "learning" process in which the actual mass $m_a$ of an inspection object is determined by weighing the object on a scale and entering the value $m_a$ into the equation $$k = -\frac{1}{m_a} * \sum_{i=1}^{n} \ln\frac{I_i}{I_{0,i}} = \frac{1}{m_a} * A \quad (4)$$

Compared to conventional checkweighing with an in-line conveyor scale, determining the mass from an X-ray scan image has the following advantages:
  no delay due to transient oscillations and thus a more precise mass measurement at faster conveyor speeds,
  the possibility of determining the individual masses of parts of the inspection object
  the possibility to determine the mass of the contents alone and thereby ignoring fluctuations in the packaging material.

On the other hand the mass correlation factor k is very sensitive to variations in the proportions of ingredients in the inspection objects. For example a minor change in the salt content of a food product will cause errors in the masses determined from the scan images, which can only be detected and corrected through the learning process of periodically measuring the actual mass $m_a$ of an inspection object on a weighing scale and updating the mass correlation factor k in accordance with equation (4).

In EP 2124024 A1, an X-ray scanning system is described which includes an in-line conveyor scale. The mass of every inspection object moving through the system is measured by the inline conveyor scale as well as determined from the scan image. The proposed use for the system is to continuously compare the two results, to signal any discrepancies larger than a predetermined value which can indicate a defect in either the conveyor scale or the X-ray scanning system, and/or to update a correction value for the mass determination from the scan image, and/or to calculate weight ratios of components with different specific gravities. As each scanned article is also weighed on a conveyor scale, the aforementioned speed advantage of "X-ray weighing" is lost with this system.

A method of estimating the mass of a scanned object which is described in EP 1950527 A1 addresses the aforementioned problem of beam hardening. The exponential relationship (1) is replaced by an empirically measured curve or table of the pixel brightness I(t) vs. thickness (t) of different calibration samples. The aim of this method is to reduce errors in estimating the mass from a scan image due to thickness variations in the inspection objects. Variations due to changes in the composition of the scanned objects would still have to be corrected through periodic weight checks and adjustments of the mass correlation factor k as described above.

In U.S. Pat. No. 6,678,396 B2, a method is described for measuring properties of meat with the use of a so-called dual energy X-ray absorption (DEXA) scanner in which two scan images (in the form of pixel brightness value arrays) of the inspection object are taken at different X-ray energy levels. Properties which are mathematically determined based on the two images include an "effective atomic number", the "chemical lean percentage", and a tenderness factor for the scanned meat. The mass of the sample is also mentioned as a property whose measurement could be improved with a dual-energy scanning method, but how this could be accomplished is not described.

US2002/0168046 A1 discloses a method and apparatus for the determination of properties of a medium of food or feed by X-ray beams having at least two energy levels. A calibration model is applied to the values generated by dual energy X-rays. The model is making use of multivariate methods such as Principal Component Regression (PCR), Multiple Linear Regression (MLR), Partial Least Squares (PLS) regression and Artificial Neural Networks (ANN).

In view of the aforementioned shortcomings of methods using only one energy level and the potential advantages of a mass determination method using two or more energy levels, the object of the present invention is to propose a mass determination method which employs a plurality of X-ray scan images at different energy levels and which can adapt itself automatically to variations in the proportions of different ingredient substances in the inspection objects.

The term "energy levels" has up to this point been used with a general meaning of spectral ranges. As mentioned above, the entire spectrum emitted by an X-ray tube in an inspection system typically covers a range from a low end of, e.g., 20 keV to a high end of, e.g., 60 to 140 keV. A "multi-energy method" as contemplated by the present invention is intended to use a plurality of sharply defined energy bands bordering directly on each other and forming a progression from a lowest to a highest energy, for example 20-60 keV, 60-100 keV and 100-140 keV in a three-energy system. Accordingly, the term "energy levels" is used hereinafter with the meaning of such defined energy bands. The energy bands could (a) originate from different radiation generators, or (b) could be determined by different spectral sensitivities of the respective detectors used for the different energy bands, or (c) by a combination of both.

In the first case (a), which could be termed "active multi-energy method", one could use for example five generators with, respectively, 40 kV, 60 kV, 80 kV, 100 kV, 120 kV, each paired with a detector cell detecting the entire energy range of the associated generator. The X-ray image for each energy band is obtained by subtraction. For example, the image in the 60-80 kV band is obtained by subtracting the 60 kV image from the 80 kV image.

Case (b), which could be termed "passive multi-energy method", could be realized in practice by using either direct-conversion energy-resolving X-ray detectors or by using a plurality of conventional dual-energy detectors, whose energy separation is optimized by design.

Case (c), the "combined method", is similar to case (a) in that a plurality of generators with, e.g. 40 kV, 60 kV, 80 kV, 100 kV, 120 kV are used. To separate the energy bands, the 40 kV generator is paired with a detector having a detection threshold of 20 kV, the 60 kV generator is paired with a detector having a detection threshold of 40 kV, etc.

The objective which has been stated above is met by the method set forth in the independent claim 1. Additional facets and details of the invention as well as the specific case of two energy bands are described in the dependent claims.

The method according to the invention serves to determine or verify the mass m of an object by scanning the object in a radiographic inspection system, specifically an X-ray scanner which has the capability to take scan images SI in the form of pixel value arrays $P_i^j=(I/I_0)_i^j$, wherein i is an integer from 1 to n identifying each of n pixels, j is an integer from 1 to J identifying each of J energy bands from a lowest level 1 to a highest level J, and wherein I represents the reduced radiation intensity of a pixel i due to absorption in the object and $I_0$ represents the full radiation intensity of the pixel i in the absence of an object. In the following, the running index i associated with a pixel will be shown as a subscript index, while the running index j associated with an energy band will be shown as a superscript index.

Basically, the method according to the invention has an initial learning mode, a normal operating mode, and a learning improvement mode.

In the initial learning mode:
a finite number u of reference objects that are of a nominally identical material composition which is representative of the composition of the objects to undergo mass determination in the normal operating mode and which varies within a limited range are individually weighed on a weighing scale to determine their respective actual masses $m_1 \ldots m_u$;
said reference objects are scanned on the radiographic inspection system to determine their respective scan images $SI_1 \ldots SI_u$; and
based on the actual masses $m_1 \ldots m_u$ and the scan images $SI_1 \ldots SI_u$ the scanning system computes and stores an initial set of parameter values defining a mathematical relationship through which an unknown mass m of an object can be determined from the scan image SI of the object.

In the normal operating mode:
sample objects of unknown mass m are scanned to acquire a scan image SI,
for each sample object of unknown mass m, scan image data gained from the scan image SI are analyzed for compatibility with the stored parameter values, and
if the scan image data are found compatible, the object mass m is determined from the scan image SI with the help of the stored parameter values,
if the data are found incompatible, the method switches to the learning improvement mode.

In the learning improvement mode:
the actual mass m of the sample object whose scan image data were found incompatible is determined by weighing the object on a weighing scale,
the scanning system updates the stored parameter values based on the scan image data and the weighed actual mass m of the object.

The method is predicated on the condition that a mathematical relationship exists between the mass m and the scan image SI of a scanned object, which can be described through the equation $$m = \frac{1}{k} * A$$

wherein k is defined as mass correlation factor and A stands for a total logarithmic absorption $$A = -\sum_{i=1}^{n}\sum_{j=1}^{J} \ln(P_i^j).$$

According to the invention, the finite number u of reference objects in the initial learning mode preferably equals the number J of energy levels, each individual reference object being identified by an integer number $v=1 \ldots u$, the mass of the individual reference object being identified as $m_v$, and the scan image of the individual reference object being identified as $SI_v$.

Accordingly, in the initial learning mode the reference objects v are weighed and scanned sequentially for $v=1 \ldots u$ until the total number u of reference objects has been reached After each reference object v has been weighed and scanned, a mass correlation factor $$k_v = \frac{1}{m_v} * A_v,$$

is calculated, wherein $A_v$, stands for a total logarithmic absorption $$A_v = -\sum_{i=1}^{n}\sum_{j=1}^{J} \ln(P_i^j)_v.$$

The mass correlation factors $k_v$ of all reference objects v are stored in a reference file $M_r$.

After the mass correlation factor $k_v$ has been determined for the reference object v, beam hardening ratios $(h_i^j)_v=(P_i^j/P_i^j)_v$ for said reference object v are determined for each pixel i at each energy level $j<J$. Alternatively, the beam hardening ratios could also be defined as $(h_i^j)_v=(P_i^j/P_i^{j-1})_v$ for each pixel i at each energy level $j<J$.

Next, an overall beam hardening ratio $H_v^j$ for each energy level $j<J$ is calculated for the reference object v, with $H_v^j$ representing the centroid of a frequency histogram of the beam hardening ratios $(h_i^j)_v$. The overall beam hardening ratios $H_v^j$ are stored together with the mass correlation factors $k_v$ in the reference file $M_r$.

The method according to the invention is further predicated on the condition that for a scanned object, the mass correlation factor k is a linear function of the overall beam hardening ratios $H^j = H^1 \ldots H^{J-1}$ as determined from the scanned image SI of the object, wherein the linear function is of the form $$k = c + a^1 H^1 + a^2 H^2 + \ldots + a^{(J-1)} H^{(J-1)}.$$

Thus, after the mass correlation factors $k_v$ and overall beam hardening ratios $H_v^j$ have been stored in the memory file $M_r$ for all of the reference objects $v = 1 \ldots u$, a system of linear equations $$c + a^1 H_1^1 + a^2 H_1^2 + \ldots + a^{(J-1)} H_1^{(J-1)} = k_1$$

$$c + a^1 H_2^1 + a^2 H_2^2 + \ldots + a^{(J-1)} H_2^{(J-1)} = k_2$$

$$c + a^1 H_u^1 + a^2 H_u^2 + \ldots + a^{(J-1)} H_u^{(J-1)} = k_u$$

can be established and solved for the unknowns $c, a^1, \ldots a^{(J-1)}$, which are subsequently stored in a coefficient file $M_c$.

The determination of the overall beam hardening ratios for the energy channels $j = 1 \ldots J-1$ in the method according to the invention serves to correct the mass determination error which is caused by changes in the respective concentrations of specific components in the product. The concentration changes are determined indirectly through the overall beam hardening ratios which, in turn, enter into the calculation of the mass correlation factor k. Consequently, the mass correlation factor k automatically adjusts itself to changes in the composition of scanned objects.

The determination of the unknown mass $m_s$ of a sample object s in the normal operating mode follows this sequence of steps:

N1 wherein the sample object s of unknown mass $m_s$ is scanned in the radiographic inspection system, whereby pixel value arrays $(P_i^j)_s$ at all of the energy levels j are acquired;

N2 wherein a total logarithmic absorption $$A_s = -\sum_{i=1}^{n} \sum_{j=1}^{J} \ln(P_i^j)_s$$

and overall beam hardening ratios $H_s^j$ for the sample object of unknown mass are calculated in the same way as the total logarithmic absorption $A_v$ and the overall beam hardening ratios $H_v^j$ are calculated in the initial learning mode;

N3 wherein the beam hardening ratios $H_s^j$ are compared to a range defined by all stored $H_v^j$-values and $H_s^j$-values in the reference file $M_r$ and wherein, if all beam hardening ratios $H_s^j$ are found within range, the method continues with step N4 and if one or more of the beam hardening ratios $H_s^j$ is found out of range, the method branches to the learning improvement mode;

N4 wherein the mass correlation factor $k_s$ for the sample object of unknown mass is calculated by inserting the beam hardening ratios $H_s^j$ into the equation $$k_s = c + a^1 H_s^1 + a^2 H_s^2 + \ldots a^{(J-1)} H_s^{J-1}$$

using the coefficients $c, a^1, \ldots 1^{(J-1)}$ from the coefficient file $M_c$.

N5 wherein the mass of the inspection object is calculated as $$m_s = \frac{1}{k_s} * A_s.$$

However, if in step N3 of the normal operating cycle, the condition is met for branching into the learning improvement mode, a learning improvement cycle with the following steps I1 to I5 is initiated:

I1 weighing the actual mass $m_s$ of the sample object s for which an out-of-range condition was found in step N3;

I2 based on $m_s$ and $A_s$, calculating the mass correlation factor $k_s$ for said object and adding $k_s$ to the reference file $M_r$;

I3 adding the beam hardening ratios $H_s^j$ for said object to the reference file $M_r$;

I4 based on all mass correlation factors and all beam hardening ratios now in the reference file $M_r$, recalculating updated coefficients $c, a^1, \ldots a^{(J-1)}$ using a least-square, best-fit procedure; and I5 updating the coefficient file $M_c$ with the recalculated coefficients $c, a^1, \ldots a^{(J-1)}$.

The concept of performing a learning improvement cycle criterion is based on the plausible assumption that the calculation of a mass correlation factor k according to the equation $$k_s = c + a^1 H_s^1 + a^2 H_s^2 + \ldots + a^{(J-1)} H_s^{J-1}$$

may be considered trustworthy only as long as the beam hardening ratios $H_s^j$ lie inside a range defined by all stored $H_v^j$-values and $H_s^j$-values in the reference file $M_r$ and that otherwise the coefficients $c, a^1, \ldots a^{(J-1)}$ may have to be adjusted.

A learning improvement cycle needs to be performed only if called for in step N3 of a normal operating cycle. As long as the beam hardening ratios determined in the normal operating mode lie within the range established by the beam hardening ratios recorded in the reference file $M_r$, the mass m can be calculated from the scan image SI.

In the calculation of the total logarithmic absorption A for the case of a multi-energy scanner system, all energy bands $j = 1 \ldots J$ are combined into a single energy range, so that the equation $$m_s = \frac{1}{k_s} * A_s$$

remains the same as for a single-energy scanner system. What is different in the multi-energy case is that the mass correlation factor $k_s$ can now be calculated as a linear function of the beam hardening ratios $H_s^j$ which can vary with the material composition of the sample object s. Consequently, the method of the present invention allows the mass $m_s$ of a sample s to be reliably determined from its scan image $SI_s$ as long as the beam hardening ratios $H_s^j$ are within a range defined by the beam hardening ratios recorded in the reference file $M_r$ in the initial learning cycle and subsequent learning improvement cycles.

A dual energy X-ray absorption (DEXA) scanner represents the simplest case of a multi-energy scanner. The individual method steps, which follow directly from the general case described above by setting $J = 2$, are described in detail in claims 12 to 14.

With two energy bands $j = 1$ and $j = 2$, there is only one overall beam hardening ratio H. The equation $k = c + a \cdot H$ for the mass correlation factor k can be graphically represented as a straight line in a graph $k(H)$. In the initial learning mode, two reference objects $v = 1$ and $v = 2$ are weighed and scanned. The associated value pairs $k_1, H_1$ and $k_2, H_2$ represent the two reference points that define the straight line after the initial learning mode. As more value pairs $k_s, H_s$, and thus more reference points, are added in subsequent learning improvement cycles, the straight line is recalculated in every learning improvement cycle as a best fit through all of the reference points.

Analogously, in the case of a three-energy scanner where J=3, three reference objects v=1,2,3 are weighed and scanned in the initial learning mode, a value triplet $k_v$, $H_v^1$, $H_v^2$ is stored in the reference file $M_r$ for each of the three objects, and coefficients c, $a_1$, $a_2$ are stored in the coefficient file $M_c$. The three value triplets can be graphically represented as three points which define a plane in a coordinate system ($H^1$, $H^2$, k). As more value triplets $k_s$, $H_s^1$, $H_s^2$, and thus more reference points, are added in subsequent learning improvement cycles, the plane is recalculated in every learning improvement cycle as a best fit through all of the reference points.

In the case of a scanner with more than three energy bands, the relationship between the mass correlation factor k and the beam hardening ratios $H^j$ can be geometrically described by a so-called hyperplane which, however, can no longer be graphically visualized.

In cases where a clear correlation can be established between the one or more overall beam hardening ratios $H^j$ and the content percentages of specific ingredient substances such as NaCl, KCl or $CaCl_2$, fat, bone, etc. it is also envisioned to use the inventive method to determine not only the masses of the scanned objects but also the content percentages of those ingredients.

In the following, the invention will be explained in more detail through examples and references to the attached drawings, wherein.

Figure 1A:
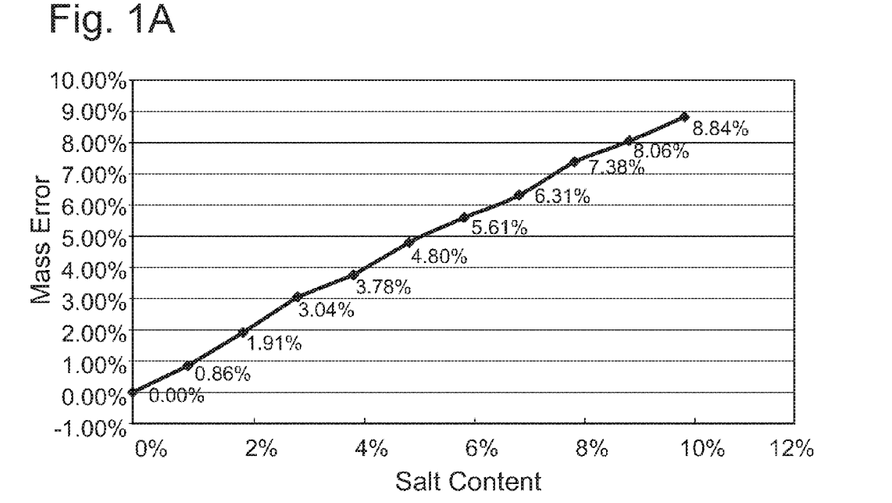
FIG. 1A illustrates the error of a mass determination with a single-energy X-ray scanner for an aqueous solution of variable salt content.

FIG. 1A serves to illustrate the problem that is to be solved by the invention. As an experiment, a sample consisting of 1 liter of distilled water, thus having a known actual mass of $m_a$=1 kg, was examined on a single-energy X-ray scanning system. In the learning mode, the mass correlation factor k was determined according to equation (4), as explained previously herein $$k = -\frac{1}{m_a} * \sum_{i=1}^{n} \ln \frac{I_i}{I_{0,i}}.$$

Subsequently, in the "weighing mode", the salt content of the sample was increased in steps, from 0% to 10%. At each step, the mass m of the sample was weighed on a scale as well as determined according to equation (3), using the value for the mass correlation factor k that was determined in the learning mode $$m = -\frac{1}{k} * \sum_{i=1}^{n} \ln \frac{I_i}{I_{0,i}}$$

As FIG. 1A illustrates, the mass amounts determined by X-ray scanning deviate from the actual mass by an error which is in approximately linear proportion to the salt content, i.e. the error increases by about 0.9% for each additional percent of salt content. The observed linearity of the mass error as a function of salt content simply reflects the fact that any continuous function f(x) can be approximated in the neighbourhood of a given point $x_0$ by its tangent line f(x)≈f($x_0$)+f'($x_0$)(x-$x_0$).

Figure 1B:
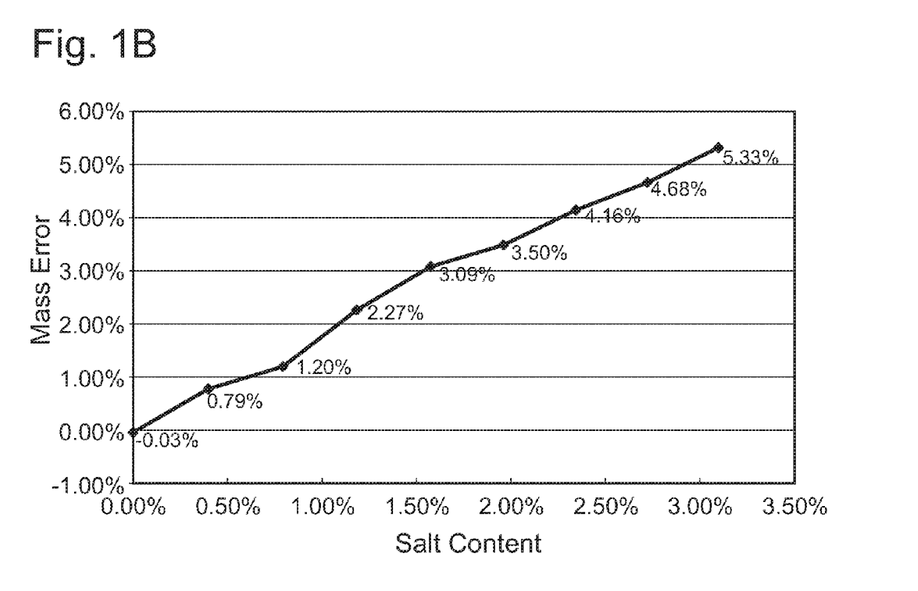
FIG. 1B illustrates the error of a mass determination with a single-energy X-ray scanner for a cereal product with a variation in salt content.

FIG. 1B shows the results of an analogous experiment with cereal packages of 750g containing different percentages of salt. Compared to the example of FIG. 1A, the error in the mass amounts determined by X-ray scanning is even larger, i.e. about 1.7% for each additional percent of salt content.

With single-energy X-ray scanning, the only way to avoid the substantial errors in the measured amounts of mass is by frequently checking the actual mass $m_a$ of the inspected products on a weighing scale and adjusting the mass correlation factor k when the deviation exceeds a given tolerance limit.

Figure 2:
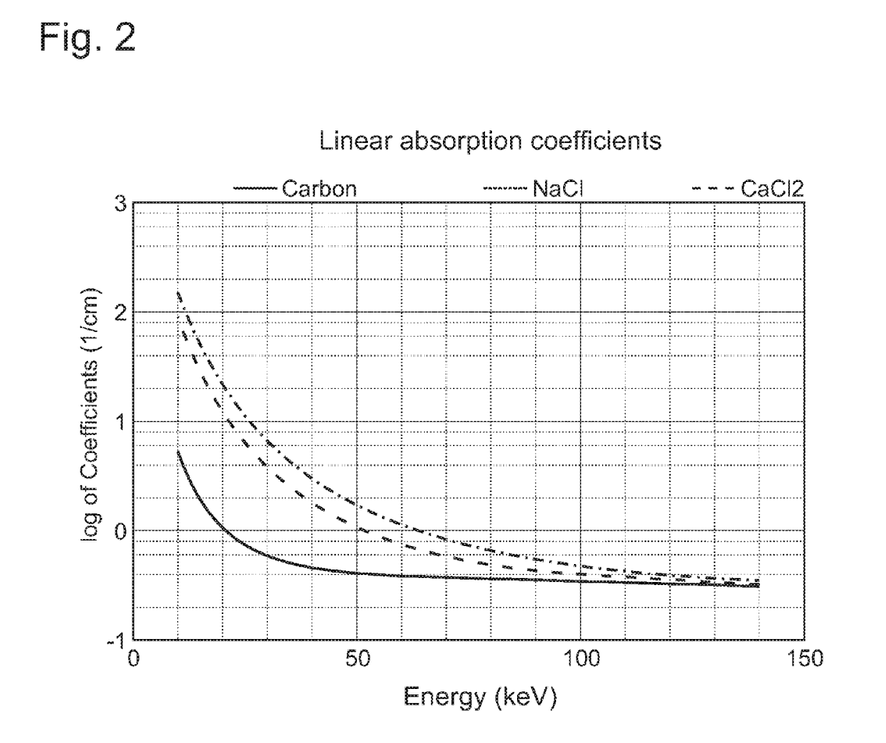
FIG. 2 represents the linear absorption coefficients of carbon, sodium chloride and calcium chloride as a function of the X-ray energy level.

The graphs of FIG. 2 illustrate the respective linear absorption coefficients of carbon, sodium chloride and calcium chloride (for example in cheese and Tofu) as a function of the X-ray energy level. At about 100 keV, the absorption coefficients begin to converge, and at 140 keV they are almost identical. The differences between the absorption coefficients of different substances at different energy levels which, as shown in this example, are most pronounced at the lower energy levels, provide the basis for the method of the present invention of determining the mass of objects from a plurality of X-ray images taken at different energy levels. The energy bands for the different images can advantageously be selected based on the particular substances that are contained in the product and have a significant influence on its mass.

Figure 3A:
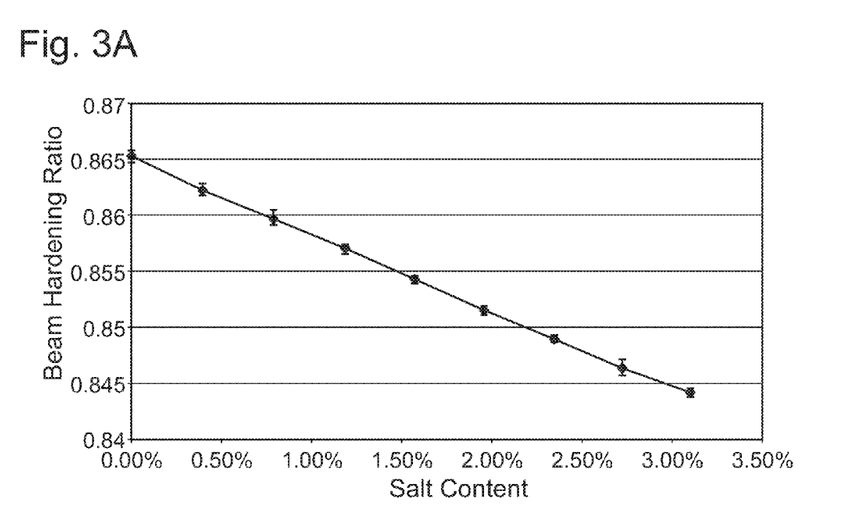
FIG. 3A illustrates the relationship between the salt content of a cereal product and the overall beam hardening ratio H for a dual-energy X-ray scanner.

FIG. 3A relates to a scanning system that operates with two levels of X-ray energy. As explained earlier in the case of a dual-energy scanning system, a hardening ratio $h_i = P_i^{Lo}/P_i^{Hi}$ can be determined individually for each pixel i, and an overall beam hardening ratio H can be calculated as the centroid value in a frequency histogram of the beam hardening ratios $h_i$. FIG. 3A shows how the overall beam hardening ratio H changes as a linear function of the salt content, using 750g cereal packages of varying salt content as in FIG. 1B. The beam hardening graph will be different for different test samples and different ingredients, but the relationship between the beam hardening ratio H and the percentage concentration of the ingredient that causes the beam hardening will always be linear.

Figure 3B:
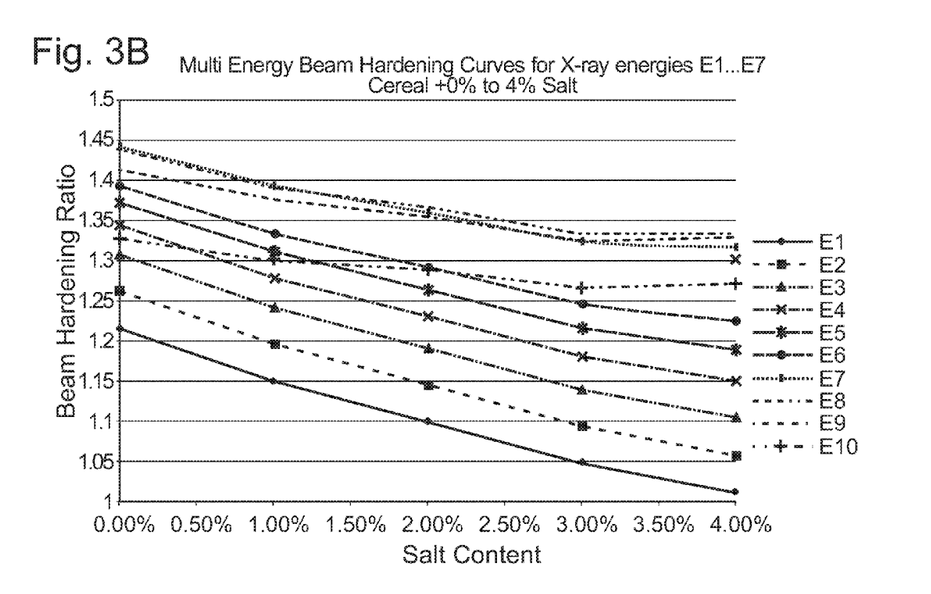
FIG. 3B illustrates the relationship between the salt content of a cereal product and the overall beam hardening ratios $H^j$ for a multi-energy X-ray scanner.

FIG. 3B shows the ten beam hardening ratio curves for a multi-energy inspection system with eleven energy levels, with E1 representing lowest and E10 the highest of the energy levels for which the beam hardening ratios were calculated. The energy bins E1 to E10 are equally distributed. The beam hardening ratios were calculated relative to the highest energy channel, E11, as this was found to produce the best resolution. The higher-energy curves>E6 show a flatter slope which indicates that the salt contribution as the determining factor for the beam hardening ratio is increasingly less represented in these energy channels. The E10-curve, which runs almost flat, indicates that the salt-content contribution in this channel is lowest.

Figure 3C:
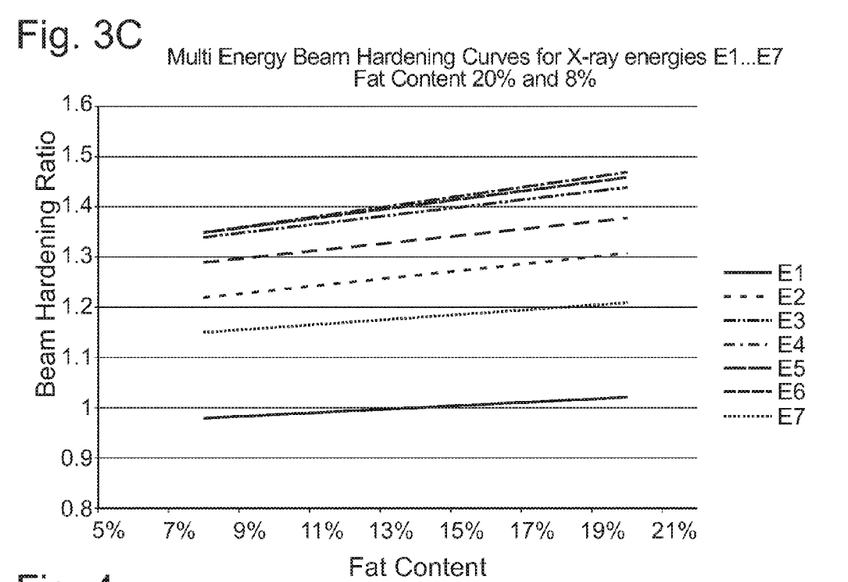
FIG. 3C illustrates the relationship between the fat content in meat and the overall beam hardening ratios $H^j$ for a multi-energy X-ray scanner.

FIG. 3C illustrates the beam hardening ratios for 8% versus 20% fat content in meat for 7 energy ranges. It is obvious that all energy channels contribute with information to the overall fat content. In this case the mass correlation factor is influenced by the fat content of the meat. The fat content can be directly taken into account by a calibration of the beam hardening ratios, and the resulting weight is then obtained by assigning the calculated mass correlation factors of the individual energy channels to the logarithmic absorption sums of the images.

As shown in FIGS. 1A and 1B, the change in the mass correlation factor k is in linear proportion to a change in the concentration of the relevant ingredient. Given that, in accordance with FIGS. 3A, 3B and 3C, the overall beam hardening ratio stands likewise in a linear relationship to the concentration of the same ingredient, it follows that the mass correlation factor k is a linear function of the beam hardening ratio H, as shown in FIG. 4.

Figure 4:
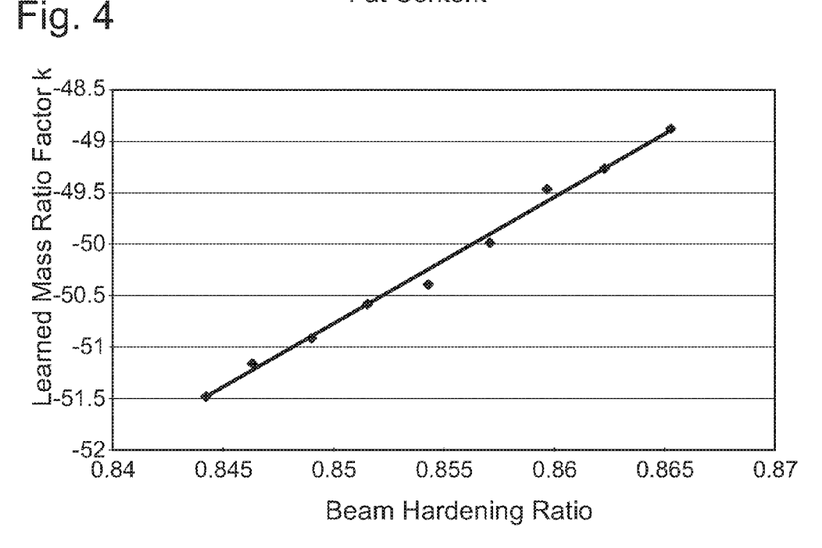
FIG. 4 illustrates the "learning phase" of the method according to the invention.
Figure 5:
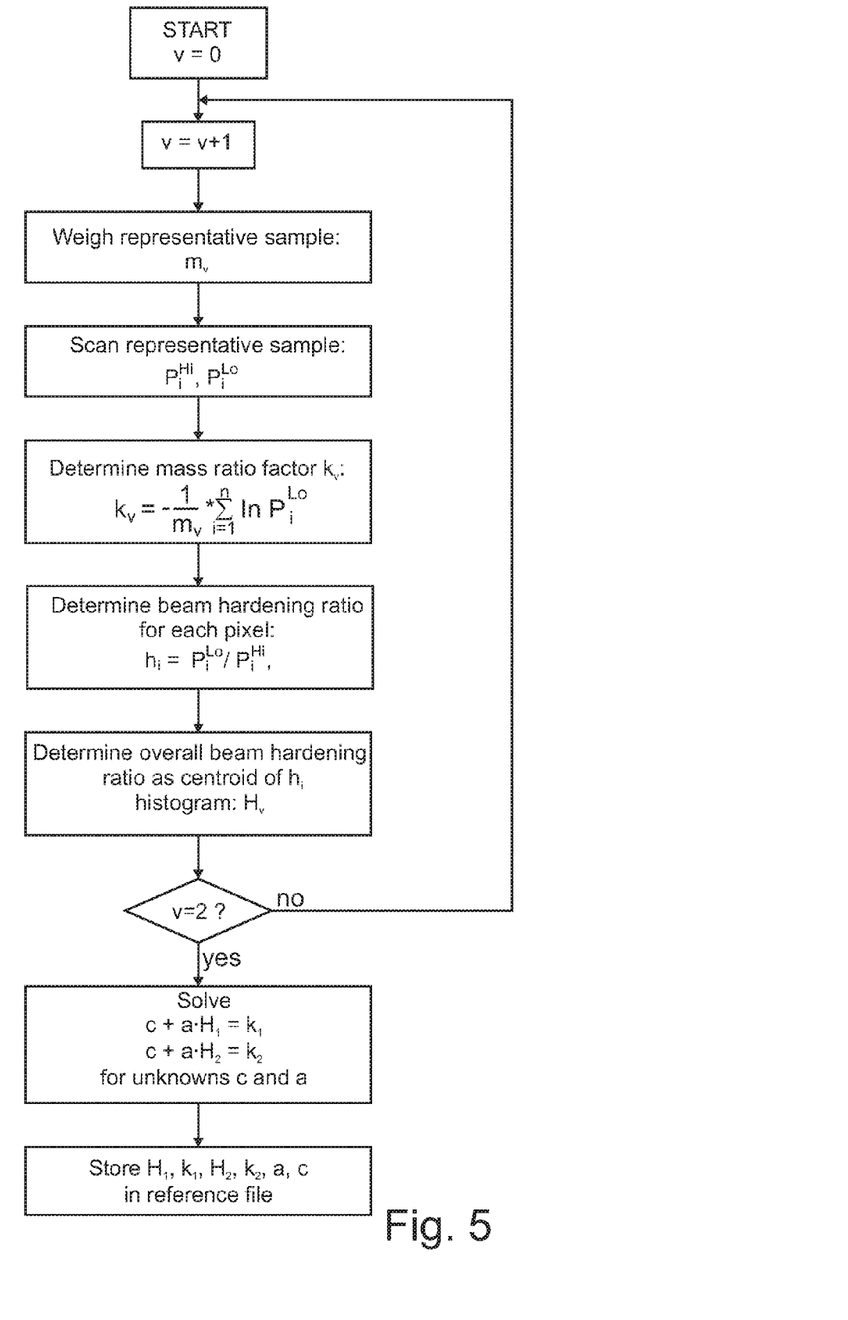
FIG. 5 represents a flowchart of the initial learning mode of the method for a DEXA scanner system.

This linear relationship is represented by the graph of FIG. 4. The points on the graph, which are shown as diamond-shaped symbols "♦", represent value pairs H, k which are generated in the initial learning mode (see flowchart FIG. 5) and in the learning improvement mode (see flowchart FIG. 6) of the method according to the invention. In the first learning cycle (FIG. 5) of the dual energy scanning system, a first beam hardening ratio $H_1$ and a first mass correlation factor $k_1$ are determined for a first test sample whose actual mass $m_1$ has been weighed on a scale. Looping through a second cycle, a second beam hardening ratio $H_2$ and a second mass correlation factor $k_2$ are determined for a second test sample whose actual mass $m_2$ has likewise been weighed on the scale. These initial two value pairs $H_1$, $k_1$ and $H_2$, $k_2$ define a straight line which can be represented by a linear equation $k=c+a \cdot H$ whose coefficients can be calculated as $a=(k_2-k_1)/(H_2-H_1)$ and $c=k_1-a \cdot H_1=k_2-a \cdot H_2$. In the last step of the initial learning mode of FIG. 5, the initial data set $H_1$, $k_1$, $H_2$, $k_2$, a, c is stored in the memory file, whereupon the system can begin to run in its regular operating mode which is illustrated in FIG. 6.

Figure 6:
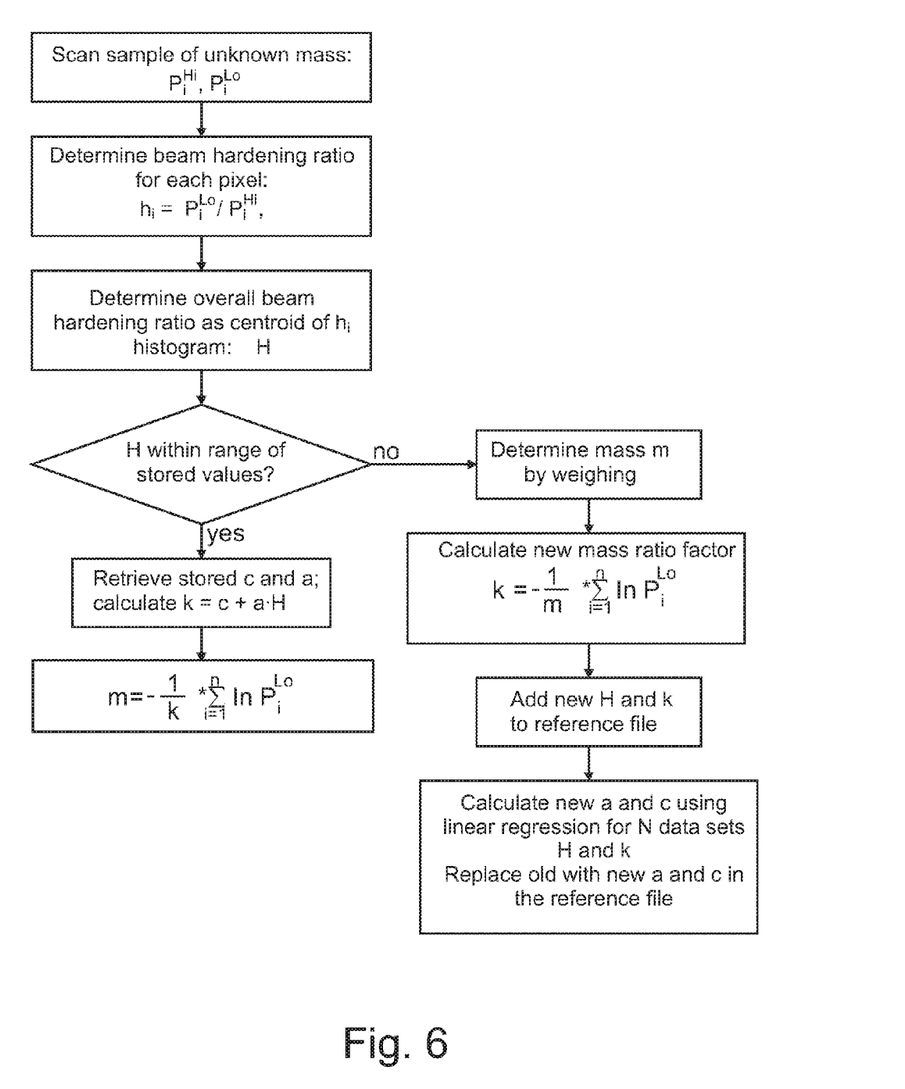
FIG. 6 represents a flowchart of the normal operating mode and the learning improvement mode of the method for a DEXA scanner system.

In the normal operating mode of the DEXA scanning system which is illustrated in FIG. 6, samples of unknown mass are scanned, i.e. their pixelated scan images $P_i^{Hi}$ and $P_i^{Lo}$ are recorded, from which the beam hardening ratio H for the sample of unknown mass is determined. Next, the value H is evaluated as to whether or not it falls within the range of the stored values for H in the memory file. If this is the case, the mass ratio $k=c+a \cdot H$ is calculated, using the stored values for c and a. In the last step of the normal operating mode, the mass m is calculated from the scan image $P_i^{Lo}$, using the calculated value for k.

If the value H is found to be outside the range of the stored values for H in the memory file, the normal operating mode branches to the learning improvement mode, where the mass m of the sample is determined by weighing. Based on this actual mass m and the scan image $P_i^{Lo}$ which has already been recorded for this sample, a new mass correlation factor k is calculated. The new mass correlation factor k and the overall beam hardening ratio H which is associated with it are stored in the memory file. The index N indicates the number of data sets H, k that are now in the memory file In the last step of the learning improvement mode, new values for the slope a and the ordinate intercept c of the linear function k(H) are calculated by using the standard linear regression formula:

$$a = \frac{\overline{k \cdot H} - \overline{k} \cdot \overline{H}}{\overline{H^2 10} - \overline{H}^2} \text{ and } c = \overline{k} - a \cdot \overline{H},$$

wherein:
$\overline{k \cdot H}$ represents the average of the N products k·H
$\overline{k}$ represents the average of the mass correlation factors k
$\overline{H}$ represents the average of the beam hardening ratios H
$\overline{H^2}$ represents the average of the squares of the ratios H
$\overline{H}^2$ represents the square of the average of the ratios H Instead of (or in addition to) branching into the learning improvement mode when a beam hardening ratio H falls outside the range of the stored beam hardening ratios in the memory file, the method could also use other criteria to branch into the learning improvement mode, e.g. after a set time interval or a set number of articles, or based on statistically determined trends or developments in the acquired data. In practice, about 10 to 20 learning cycles will be sufficient to cover a wide range of variation in the concentration of the relevant ingredient in the respective food product.

If any learning improvement cycle leads to a value pair (H, k) with a mass correlation factor k that differs significantly from the value which would be obtained from the existing best-fit straight line, the system could be programmed to interpret this as an implausible result which could indicate a problem in the scanned product or a defect of the system.

Figure 7:
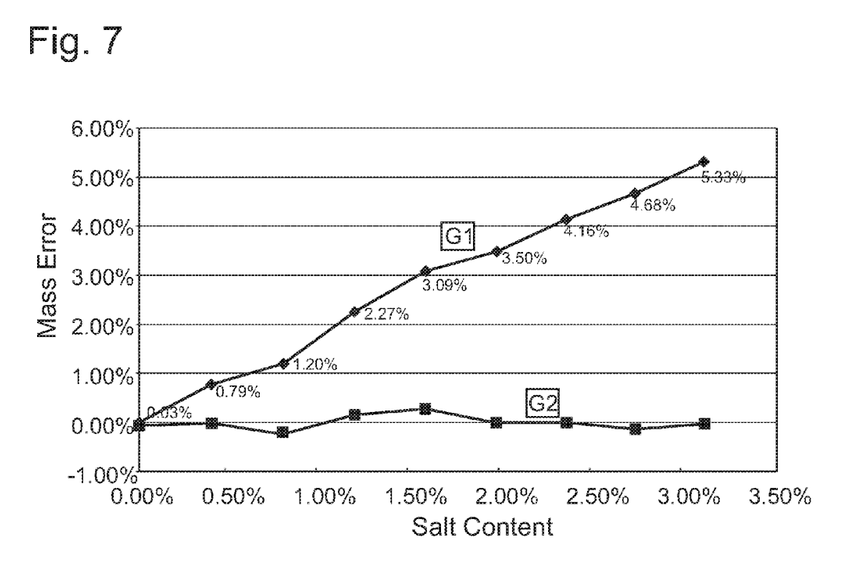
FIG. 7 illustrates the error in the mass determination as a function of variable salt content in a cereal product when measured with a dual-energy X-ray scanner in contrast to a single-energy X-ray scanner.

The significant improvement which is achieved as a result of using the mass determination method according to the invention in a dual-energy scanning system in comparison to determining the mass of scanned objects with a single-energy system is documented in FIG. 7. Graph G1 represents a duplicate of the graph in FIG. 1B for the weight determination errors in cereal packages of 750g containing different percentages of salt, using a single-energy scanner system. Within the range of the graph, i.e. up to 3% salt content, the error in the mass amounts determined by single-energy X-ray scanning increases by about 1.7% for each additional percent of salt content. Graph G2, in contrast, represents the weight determination errors for the same product when the dual-energy method according to the invention is used. The mass determination error never exceeds 0.3% over the entire range from 0 to 3% salt content.

In this example, the method according to the invention could also be used, in addition to the mass measurement, to determine the content percentage of sodium chloride (or other relevant ingredients whose concentration affects the beam hardening ratio H). To accomplish this, the learning mode would have to be expanded, so that each learning cycle includes, in addition to weighing the actual mass $m_a$, a measurement of the actual content percentage $CP_a$ of sodium chloride. Analogous to the linear relationship between the overall hardening ratio H and the mass correlation factor k (see FIG. 4), the correlation between the overall hardening ratio H and the percentage CP can be established as a best-fit straight-line graph from which the percentage content CP can be determined based on the hardening ratio.

The method according to the invention also allows identification of object compositions being significantly different from the object itself, for example those resulting from foreign materials inside the inspected objects, such as screws made of steel in a food-product. That kind of relatively large foreign objects has a significant influence on the beam hardening.

Although the invention has been described through the presentation of a specific example, it will be evident to the reader that numerous further variant embodiments could be developed from the teachings of the present invention, for example by applying the method of the invention to different food products and different ingredients as well as to applications outside the food industry. It goes without saying that any such variant embodiments are considered to be part of the present invention.

The invention claimed is:

1. A method of determining the mass of an object by scanning the object in a radiographic inspection system, specifically an X-ray scanner which has the capability to take scan images of n pixels in a plural number J of energy bands, wherein a scan image SI is constituted by a pixel value array SI, meaning an array $P_i^j=(I/I_0)_i^j$ wherein i is an integer from 1 to n identifying each of n pixels, j is an integer from 1 to J identifying each of J energy bands from a lowest level 1 to a highest level J, and wherein I represents the reduced radiation intensity of a pixel i due to absorption in the object and $I_0$ represents the full radiation intensity of the pixel i in the absence of an object, the method comprising an initial learning mode, a normal operating mode, and a learning improvement mode;

wherein the initial learning mode comprises the steps of:
individually weighing on a weighing scale a finite number u of reference objects that are of a nominally identical material composition which is representative of the composition of the objects to undergo mass determination in the normal operating mode and which varies within a limited range, and thereby determining the respective actual masses $m_1 \ldots m_u$ of said reference objects,
scanning said reference objects on the radiographic inspection system to determine their respective scan images $SI_1 \ldots SI_u$, and
based on the actual masses $m_1 \ldots m_u$ and the scan images $SI_1 \ldots SI_u$, computing and storing in the scanning system an initial set of parameter values that define a mathematical relationship between the mass m of an object and the scan image SI of the object;

wherein the normal operating mode comprises the steps of:
scanning sample objects of unknown mass m and thereby acquiring a scan image SI for each of said sample objects of unknown mass m,
for each sample object of unknown mass m, determining a set of scan image data from the scan image SI, analyzing said scan image data for compatibility with the stored parameter values, and
if the scan image data are found compatible, determining the object mass m from the scan image SI with the help of the stored parameter values, or
if the data are found incompatible, switching to the learning improvement mode; and wherein the learning improvement mode comprises the steps of:
determining the actual mass m of the sample object whose scan image data were found incompatible by weighing said sample object on a weighing scale, and
updating the parameter values stored in the scanning system based on the scan image data and the weighed actual mass m of the object;

wherein, in the initial learning mode the finite number u of reference objects equals the number J of energy levels, each individual reference object being identified by an integer number $v=1 \ldots u$, the mass of the individual reference object being identified as $m_v$, and the scan image of the individual reference object being identified as $SI_v$;

wherein for each reference object v, a mass correlation factor $k_v$ is calculated according to the formula $$k_v = \frac{1}{m_v} * A_v,$$

wherein $A_v$ stands for a total logarithmic absorption $A_v$ defined by the equation $$A_v = -\sum_{i=1}^{n}\sum_{j=1}^{J} \ln(P_i^j)_v,$$

and that $k_v$ is stored in a reference file $M_r$ assigned to the reference objects; and in that for each scanned reference object v, beam hardening ratios $(h_i^j)_v=(P_i^j/P_i^J)_v$ or alternatively beam hardening ratios $(h_i^j)_v=(P_i^j/P_i^{j-1})_v$ are determined for each pixel i at each energy level j<J; wherein for each energy level j<J and each reference object v, an overall beam hardening ratio $H_v^j$ is calculated as the centroid of a frequency histogram of the beam hardening ratios $(h_i^j)_v$, and that the overall beam hardening ratios $H_v^j$ are stored together with the mass correlation factors $k_v$ in the reference file $M_r$.

2. The method according to claim 1, wherein, for a scanned object, the mass correlation factor k is a linear function of the overall beam hardening ratios $H^j=H^1 \ldots H^{J-1}$ as determined from the scanned image SI of said object, the linear function being of the form $$k=c+a^1H^1+a^2H^2+\ldots+a^{(J-1)}H^{(J-1)}.$$

3. The method according to claim 1, wherein after the mass correlation factors $k_v$ and overall beam hardening ratios $H_v^j$ have been stored in the memory file $M_r$ for reference objects $v=1 \ldots u$, a system of linear equations $$c+a^1H_1^1+a^2H_1^2+\ldots+a^{(J-1)}H_1^{(J-1)}=k_1$$

$$c+a^1H_2^1+a^2H_2^2+\ldots+a^{(J-1)}H_2^{(J-1)}=k_2$$

$$c+a^1H_u^1+a^2H_u^2+\ldots+a^{(J-1)}H_u^{(J-1)}=k_u$$

is solved for the unknowns c, $a^1, \ldots a^{(J-1)}$, which are subsequently stored in a coefficient file $M_c$.

4. The method according to claim 3, wherein the normal operating mode comprises the steps:

N1 scanning the sample object s of unknown mass ms in the radiographic inspection system, whereby pixel value arrays $(P_i^j)_s$ at all of the energy levels j are acquired;

N2 calculating a total logarithmic absorption $$A_s = -\sum_{i=1}^{n}\sum_{j=1}^{J} \ln(P_i^j)_s$$

and overall beam hardening ratios $H_s^j$ for the sample object of unknown mass in the same way as the total logarithmic absorption $A_v$ and the overall beam hardening ratios $H_v^j$ are calculated in the initial learning mode;

N3 comparing the beam hardening ratios $H_s^j$ to a range defined by all stored $H_v^j$-values and $H_s^j$—values in the reference file $M_r$ and, if all beam hardening ratios $H_s^j$ are found within range, continuing the method with step N4 or, if one or more of the beam hardening ratios $H_s^j$ is found out of range, branching to the learning improvement mode of the method;

N4 calculating the mass correlation factor $k_s$ for the sample object of unknown mass by inserting the beam hardening ratios $H_s^j$ into the equation $$k_s = c + a^1 H_s^1 + a^2 H_s^2 + \ldots a^{(J-1)} H_s^{J-1}$$

using the coefficients $c, a^1, \ldots a^{(J-1)}$ from the coefficient file $M_c$; and N5 calculating the mass of the inspection object as $$m_s = \frac{1}{k_s} * A_s.$$

5. The method according to claim 4, wherein the learning improvement mode comprises the steps:

I1 weighing the actual mass ms of the sample object s for which an out-of-range condition was found in step N3;

I2 based on ms and $A_s$, calculating the mass correlation factor $k_s$ for said object and adding $k_s$ to the reference file $M_r$;

I3 adding the beam hardening ratios $H_s^j$ for said object to the reference file $M_r$;

I4 based on all mass correlation factors and all beam hardening ratios now in the reference file $M_r$, recalculating updated coefficients $c, a^1, \ldots a^{(J-1)}$ using a least-square, best-fit procedure; and I5 updating the coefficient file $M_c$ with the recalculated coefficients $c, a^1, \ldots a^{(J-1)}$.

6. The method according to claim 5, wherein, in cases where a clear correlation can be established between one or more overall beam hardening ratios $H^j$ and the content percentages of specific ingredient substances, such as NaCl, KCl or $CaCl_2$, fat, bone, etc., the inventive method is also used to determine the content percentages of those ingredients of the scanned objects.

7. The method according to claim 6, wherein the radiographic inspection system is a dual-energy X-ray absorption (DEXA) scanner taking scan images at two energy levels j=1 and j=2, characterized in that the initial learning mode comprises the steps:

L1 determining the actual mass $m_1$ of a first representative reference object v=1 by weighing;

L2 scanning the representative reference object v=1 in the radiographic inspection system, whereby a pixel value array $(P_i^1)_{v=1}$ at the lower and a pixel value array $(P_i^2)_{v=1}$ at the higher of the two energy levels are acquired;

L3 based on the first actual mass $m_1$ and the pixel value arrays $(P_i^1)_{v=1}$ and $(P_i^2)_{v=1}$, calculating a first mass correlation factor $$k_1 = \frac{1}{m_1} * A_1$$

and storing said mass correlation factor in a reference file $M_r$, wherein $$A_1 = -\sum_{i=1}^{n} (\ln P_i^1 + \ln P_i^2)_{v=1};$$

L4 determining beam hardening ratios $(h_i)_{v=1} = (P_i^1/P_i^2)_{v=1}$ individually for each pixel, calculating a first overall beam hardening ratio $H_1$ as the centroid of a frequency histogram of the beam hardening ratios $(h_i)_{v=1}$ and storing said first overall beam hardening ratio $H_1$ in the reference file $M_r$ together with the first mass correlation factor $k_1$;

L5 repeating steps L1 to L4 once with a second reference object v=2 of a second sample mass $m_2$, thereby determining a second mass correlation factor $k_2$ and a second overall beam hardening ratio $H_2$, and storing said second mass correlation factor $k_2$ and second overall beam hardening ratio $H_2$ in the reference file $M_r$;

L6 calculating the constants c and a of a linear equation $$k = c + a \cdot H$$

based on a system of linear equations $$c + a \cdot H_1 = k_1$$

$$c + a \cdot H_2 = k_2$$

where c and a are the unknowns and $H_1, k_1, H_2, k_2$ are the values that were stored in the reference file $M_r$ according to steps L3, L5 and L6; and L7 storing the now known coefficients a and c in a coefficient file $M_c$.

8. The method of claim 6, characterized in that the normal operating cycle comprises the steps:

N1 scanning a sample object of unknown mass $m_s$ in the radiographic inspection system and thereby acquiring a pixel value array $(P_i^1)_s$ at the lower and a pixel value array $(P_i^2)_s$ at the higher of the two energy levels;

N2 calculating an overall beam hardening ratio $H_s$ for said sample object in the same way as the overall beam hardening ratios $H_1, H_2$ were calculated in the initial learning mode;

N3 comparing the overall beam hardening ratio $H_s$ to the range defined by all of the $H_v$-values and $H_s$-values stored in the reference file $M_r$ and, if $H_s$ is found within range, continuing the method with step N4 or, if $H_s$ is found out of range, branching to the learning improvement mode of the method;

N4 calculating the mass correlation factor $k_s$ for the sample object of unknown mass by inserting the overall beam hardening ratio $H_s$ into the equation $$k_s = c + a \cdot H_s,$$

using the coefficients c and a from the coefficient file $M_c$; and

N5 calculating the mass $m_s$ of the sample object as $$m_s = \frac{1}{k_s} * A_s,$$

where $A_s$ stands for a total logarithmic absorption calculated from the pixel value arrays $(P_i^1)_s$ and $(P_i^2)_s$ acquired in step N1

$$A_s = -\sum_{i=1}^{n}(\ln P_i^1 + \ln P_i^2)_s.$$

9. The method of claim 6, wherein the learning improvement mode comprises the steps:
   I1 weighing the actual mass $m_s$ of the sample object for which an out-of-range condition was found in step N3;
   I2 based on $m_s$, calculating the mass correlation factor $k_s$ for said object and adding $k_s$ to the reference file $M_r$;
   I3 adding the beam hardening ratio $H_s$ for said sample object to the reference file $M_r$;
   I4 based on the mass correlation factors $k_1$, $k_2$ and overall beam hardening ratios $H_1$, $H_2$ stored in the reference file $M_r$ during the initial learning mode and the mass correlation factors $k_s$ and overall beam hardening ratios $H_s$ added to the reference file $M_r$ during subsequent cycles of the learning improvement mode, recalculating the coefficients c and a using a least-square, best-fit procedure; and
   I5 updating the coefficient file $M_c$ with the recalculated coefficients c and a.

10. The method according to claim 2, wherein, after the mass correlation factors $k_v$ and overall beam hardening ratios $H_v^j$ have been stored in the memory file $M_r$ for reference objects $v=1 \ldots u$, a system of linear equations $$c+a^1H_1^1+a^2H_1^2+\ldots+a^{(J-1)}H_1^{(J-1)}=k_1$$
$$c+a^1H_2^1+a^2H_2^2+\ldots+a^{(J-1)}H_2^{(J-1)}=k_2$$
$$c+a^1H_u^1+a^2H_u^2+\ldots+a^{(J-1)}H_u^{(J-1)}=k_u$$

is solved for the unknowns c, $a^1, \ldots a^{(J-1)}$), which are subsequently stored in a coefficient file $M_c$.

11. The method according to claim 1, wherein the normal operating mode comprises the steps:
   N1 scanning the sample object s of unknown mass ms in the radiographic inspection system, whereby pixel value arrays $(P_i^j)_s$ at all of the energy levels j are acquired;
   N2 calculating a total logarithmic absorption $$A_s = -\sum_{i=1}^{n}\sum_{j=1}^{J}\ln(P_i^j)_s$$

and overall beam hardening ratios $H_s^j$ for the sample object of unknown mass in the same way as the total logarithmic absorption $A_v$ and the overall beam hardening ratios $H_v^j$ are calculated in the initial learning mode;
   N3 comparing the beam hardening ratios $H_s^j$ to a range defined by all stored $H_v^j$-values and $H_s^j$-values in the reference file $M_r$ and, if all beam hardening ratios $H_s^j$ are found within range, continuing the method with step N4 or, if one or more of the beam hardening ratios $H_s^j$ is found out of range, branching to the learning improvement mode of the method;
   N4 calculating the mass correlation factor $k_s$ for the sample object of unknown mass by inserting the beam hardening ratios $H_s^j$ into the equation $$k_s=c+a^1H_s^1+a^2H_s^2+\ldots a^{(J-1)}H_s^{J-1}$$

using the coefficients c, $a^1, \ldots a^{(J-1)}$) from the coefficient file $M_c$;
   N5 calculating the mass of the inspection object as $$m_s = \frac{1}{k_s} * A_s.$$

12. The method according to claim 1, wherein the learning improvement mode comprises the steps:
   I1 weighing the actual mass $m_s$ of the sample object s for which an out-of-range condition was found in step N3;
   I2 based on ms and As, calculating the mass correlation factor $k_s$ for said object and adding ks to the reference file $M_r$;
   I3 adding the beam hardening ratios $H_s^j$ for said object to the reference file $M_r$;
   I4 based on all mass correlation factors and all beam hardening ratios now in the reference file $M_r$, recalculating updated coefficients c, $a_1, \ldots a^{(J-1)}$) using a least-square, best-fit procedure; and
   I5 updating the coefficient file $M_c$ with the recalculated coefficients c, $a^1, \ldots a^{(J-1)}$).

13. The method according to claim 1, wherein, in cases where a clear correlation can be established between one or more overall beam hardening ratios $H^j$ and the content percentages of specific ingredient substances, such as NaCl, KCl or $CaCl_2$, fat, bone, etc., the inventive method is also used to determine the content percentages of those ingredients of the scanned objects.

14. The method according to claim 1, wherein the radiographic inspection system is a dual-energy X-ray absorption (DEXA) scanner taking scan images at two energy levels j=1 and j=2, characterized in that the initial learning mode comprises the steps:
   L1 determining the actual mass $m_1$ of a first representative reference object v=1 by weighing;
   L2 scanning the representative reference object v=1 in the radiographic inspection system, whereby a pixel value array $(P_i^1)_{v=1}$ at the lower and a pixel value array $(P_i^2)_{v=1}$ at the higher of the two energy levels are acquired;
   L3 based on the first actual mass mi and the pixel value arrays $(P_i^1)_{v=1}$ and $(P_i^2)_{v=1}$, calculating a first mass correlation factor $$k_1 = \frac{1}{m_1} * A_1$$

and storing said mass correlation factor in a reference file $M_r$, wherein $$A_1 = -\sum_{i=1}^{n}(\ln P_i^1 + \ln P_i^2)_{v=1};$$

L4 determining beam hardening ratios $(h_i)_{v=1}=(P_i^1/P_i^2)_{v=1}$ individually for each pixel, calculating a first overall beam hardening ratio $H_1$ as the centroid of a frequency histogram of the beam hardening ratios $(h_i)_{v=1}$ and storing said first overall beam hardening ratio $H_1$ in the reference file $M_r$ together with the first mass correlation factor $k_1$;

L5 repeating steps L1 to L4 once with a second reference object $v=2$ of a second sample mass $m_2$, thereby determining a second mass correlation factor $k_2$ and a second overall beam hardening ratio $H_2$, and storing said second mass correlation factor $k_2$ and second overall beam hardening ratio $H_2$ in the reference file $M_r$;

L6 calculating the constants c and a of a linear equation $$k=c+a\cdot H$$

based on a system of linear equations $$c+a\cdot H_1=k_1$$

$$c+a\cdot H_2=k_2$$

where c and a are the unknowns and $H_1$, $k_1$, $H_2$, $k_2$ are the values that were stored in the reference file $M_r$ according to steps L3, L5 and L6; and L7 storing the now known coefficients a and c in a coefficient file $M_c$.

15. The method of claim 7, wherein the learning improvement mode comprises the steps:

I1 weighing the actual mass $m_s$ of the sample object for which an out-of-range condition was found in step N3;

I2 based on ms, calculating the mass correlation factor $k_s$ for said object and adding $k_s$ to the reference file $M_r$;

I3 adding the beam hardening ratio $H_s$ for said sample object to the reference file $M_r$;

I4 based on the mass correlation factors $k_1$, $k_2$ and overall beam hardening ratios $H_1$, $H_2$ stored in the reference file $M_r$ during the initial learning mode and the mass correlation factors $k_s$ and overall beam hardening ratios $H_s$ added to the reference file $M_r$ during subsequent cycles of the learning improvement mode, recalculating the coefficients c and a using a least-square, best-fit procedure; and I5 updating the coefficient file $M_c$ with the recalculated coefficients c and a.

\* \* \* \* \*

UNITED STATES PATENT AND TRADEMARK OFFICE
CERTIFICATE OF CORRECTION

| | |
|---|---|
| PATENT NO. | : 9,945,714 B1 |
| APPLICATION NO. | : 15/561419 |
| DATED | : April 17, 2018 |
| INVENTOR(S) | : Hartwig |

It is certified that error appears in the above-identified patent and that said Letters Patent is hereby corrected as shown below:

On the Title Page

Item (57) Abstract, Line 4, please delete "leves" and insert -- levels --.

Item (57) Abstract, Line 6, please delete "inintial" and insert -- initial --.

Item (57) Abstract, Line 7, please delete "refernce object" and insert -- reference objects --.

Item (57) Abstract, Line 9, please delete "smaple" and insert -- sample --.

In the Specification

In Column 1, Line 65, please delete "$I_i(\mu,d)=I_{0,i} \cdot e^{-31\,\mu,d}$ (1)"
and insert -- $I_i(\mu,d) = I_{0,i} \cdot e^{-\mu,d}$ (1) --.

In Column 2, Line 49, please delete "coefficient p" and insert -- coefficient µ --.

In Column 3, Line 21, please delete "p1".

In Column 3, Line 21, please move "µ is the absorption" down to the next line.

In Column 6, Line 44, please delete "$A_v,$" and insert -- $A_v$ --.

In Column 6, Line 56, please delete "$P_i^j)_v$" and insert -- $P_i^j)_v$ --.

In Column 6, Line 58, please delete "$(h_i^j)_v = (P_i^j/P_i^{j-1})_v$" and insert -- $(h_i^j)_v = (P_i^j/P_i^{j+1})_v$ --.

Signed and Sealed this
Second Day of July, 2019

Andrei Iancu
*Director of the United States Patent and Trademark Office*

CERTIFICATE OF CORRECTION (continued)
U.S. Pat. No. 9,945,714 B1

In Column 12, Lines 15-16, please delete "$a = \frac{\overline{k \cdot H} - \overline{k} \cdot \overline{H}}{\overline{H^2 10} - \overline{H}^2}$ and $c = \overline{k} - a \cdot \overline{H}$," and insert -- $a = \frac{\overline{k \cdot H} - \overline{k} \cdot \overline{H}}{\overline{H^2 10} - \overline{H}^2}$ and $c = \overline{k} - a \cdot \overline{H}$, --.

In the Claims

In Column 14, Line 39, please delete "$(h_i^j)_v = (P_i^j / P_i^{j-1})_v$" and insert -- $(h_i^j)_v = (P_i^j / P_i^{j+1})_v$ --.

In Column 14, please insert -- ························ -- as its own line after Line 61.

In Column 15, Line 1, please delete "ms" and insert -- $m_s$ --.

In Column 15, Line 27, please delete "$k_s = c + a^1 H_s^1 + a^2 H_s^2 + \ldots a^{(j-1)} H_s^{J-1}$" and insert -- $k_s = c + a^1 H_s^1 + a^2 H_s^2 + \ldots + a^{(J-1)} H_s^{J-1}$ --.

In Column 15, Line 39, please delete "ms" and insert -- $m_s$ --.

In Column 15, Line 41, please delete "ms" and insert -- $m_s$ --.

In Column 17, Line 50, please delete "ms" and insert -- $m_s$ --.

In Column 18, Line 8, please delete "$k_s = c + a^1 H_s^1 + a^2 H_s^2 + \ldots a^{(j-1)} H_s^{J-1}$" and insert -- $k_s = c + a^1 H_s^1 + a^2 H_s^2 + \ldots + a^{(J-1)} H_s^{J-1}$ --.

In Column 18, Line 21, please delete "ms and As" and insert -- $m_s$ and $A_s$ --.

In Column 18, Line 22, please delete "ks" and insert -- $k_s$ --.

In Column 18, Line 28, please delete "$a_1$" and insert -- $a^1$ --.

In Column 18, Line 52, please delete "mi" and insert -- $m_l$ --.

In Column 20, Line 10, please delete "ms" and insert -- $m_s$ --.